Dec. 16, 1952  S. H. NORTON  2,621,414
GAUGING FIXTURE

Filed Aug. 19, 1949  2 SHEETS—SHEET 1

Inventor
Samuel H. Norton

By The firm of Charles H. Hill Attys

Dec. 16, 1952   S. H. NORTON   2,621,414
GAUGING FIXTURE

Filed Aug. 19, 1949   2 SHEETS—SHEET 2

Inventor
Samuel H. Norton

Patented Dec. 16, 1952

2,621,414

UNITED STATES PATENT OFFICE 2,621,414

GAUGING FIXTURE

Samuel H. Norton, University Heights, Ohio, assignor to Thompson Products, Inc., Cleveland, Ohio, a corporation of Ohio Application August 19, 1949, Serial No. 111,319

9 Claims. (Cl. 33—174)

1

This invention relates to improvements in gauging fixtures and more particularly relates to a gauging fixture adapted to gauge the circumference or gap between adjacent ends of inherently springy piston rings or the like.

The principal object of my invention is to provide a simplified gauging fixture of a novel form and arrangement adapted to measure both the free and compressed lengths of a spring such as a spring type piston ring.

A further object of my invention is to provide a new and improved form of gauging fixture adapted to gauge the length of compressible spring type piston rings by compressing the ring to the circumference it will assume when in a piston and cylinder of an internal combustion engine and gauging the gap or overlap between adjacent ends of the ring.

A still further object of my invention is to provide a simple and efficient form of gauging fixture for a flexible oil piston ring having a spiral guide of cylinder bore form adapted to receive and confine the piston ring to a spiral form against a stationary abutment, to gauge the length of the ring when free, and also having a movable abutment member adapted to engage the free end of the piston ring and compress it to the form it will assume when in the piston and cylinder of an internal combustion engine, together with indicating means enabling the gap between or overlap of adjacent ends of the ring to be measured when so compressed.

These and other objects of my invention will appear from time to time as the following specification proceeds and with reference to the accompanying drawings wherein.

Figure 1:
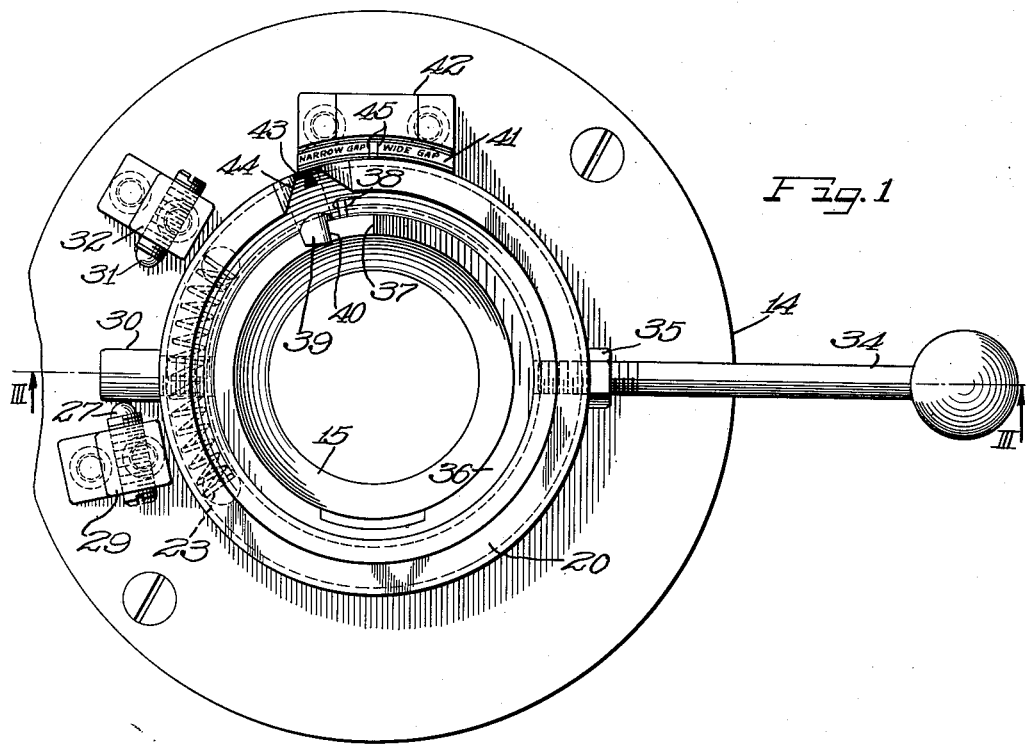
Figure 1 is a top plan view of a gauging fixture constructed in accordance with my invention showing the fixture in an open position ready to receive a piston ring.
Figure 3:
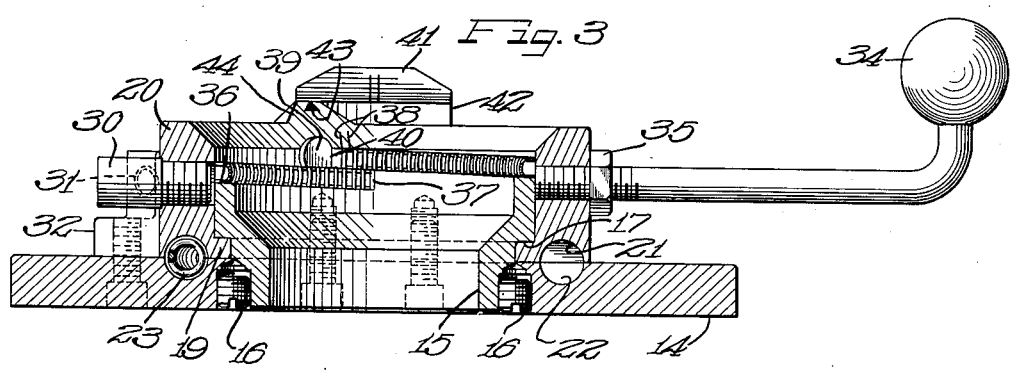
Figure 4:
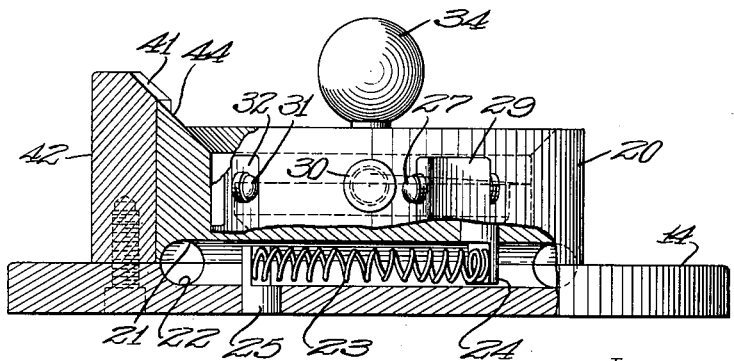

Figure 3 is a transverse sectional view taken substantially along line III—III of Figure 1 and showing a piston ring in position in the fixture in a free condition; and Figure 4 is a view in side elevation of the fixture, looking toward the fixture from the side thereof opposite its operating handle, with certain parts broken away and certain other parts shown in vertical section, in order to show certain details of construction thereof.

Figure 2:
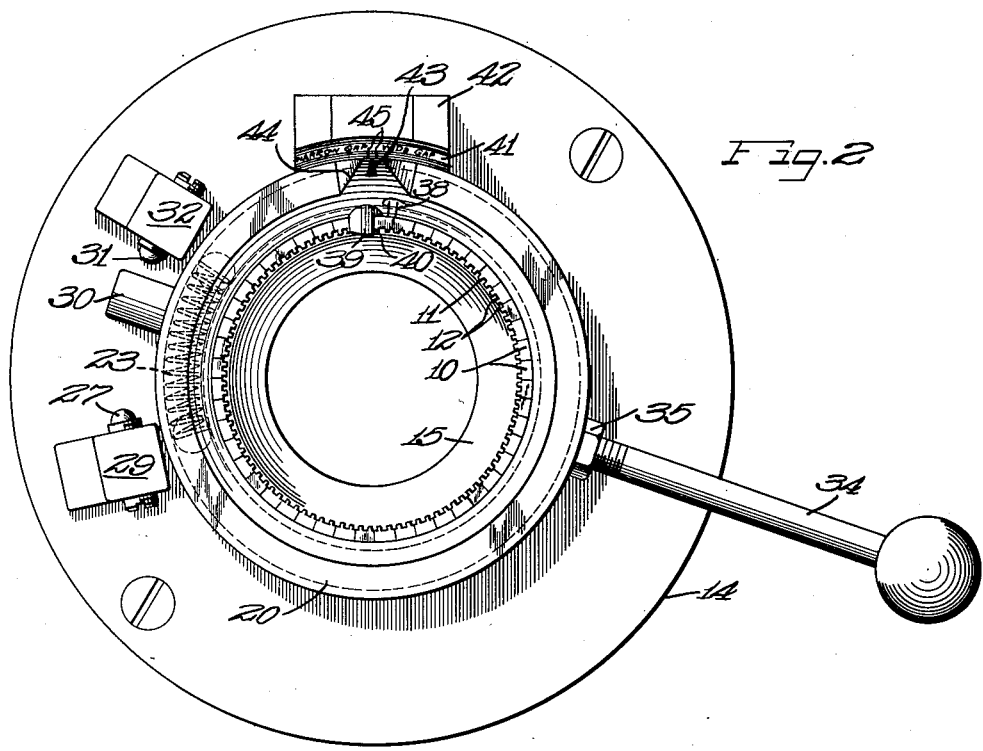
Figure 2 is a view somewhat similar to Figure 1 but showing an oil piston ring in the fixture in a compressed condition.

The general type of piston ring adapted to be gauged or measured by the apparatus of my invention may be a well known form of oil piston ring, which may be similar to the form of ring shown in Figs. 2 and 3 of my application Serial No. 111,312, filed August 19, 1949, and entitled "Piston Ring Making Machine and Process." The ring as shown in Figs. 2 and 3 of the present application is of a U-shaped cross

2 section and includes generally two axially spaced apart annular rows of crown segments 10—10 connected together by a web 11 having parallel spaced transverse slots 12—12 formed in said web throughout the circumference of the ring. Said crown segments may be alternately slit and the adjacent edges of the slit portions thereof substantially conform to radial lines extending through the center of the ring when compressed, to form segments in substantially the form of segments of a circle. Said ring has a certain amount of resiliency by the nature of its heat treatment and the material from which it is constructed, and the slits of the crown segments and slots in the web impart flexibility to the ring so that it tends to spring apart when free, leaving spaces between adjacent ends of the crown segments, and is compressed when inserted in a piston and cylinder of an internal combustion engine with very little clearance between adjacent edges of the crown segments. The fixture of my present invention gauges the length of the ring when free by properly placing it therein, and when compressed by compressing the ring to the form it will assume when in a cylinder and piston and by measuring or gauging the gap between or overlap of adjacent ends of the ring.

The gauging fixture includes generally a base plate 14 adapted to rest on a bench or table, and herein shown as being annular and as having an annular guide member 15 mounted within and extending upwardly from the opening therein, and carrying the piston ring during the gauging operation. Set screws 16—16 threaded in the bottom of said base and guide member are provided to secure said guide member to said base (see Figure 3). Said guide member has a shouldered portion 17 adjacent but spaced upwardly from said base plate 14 and forming a recessed guide for an annular flange or gib 19 extending inwardly from the lower end of a compression member 20. Said compression member is herein shown as resting on said base plate and as being guided for rotational movement about said guide member to compress the piston ring and gauge the length thereof.

The bottom of the compression member 20 is herein shown as having a semi-circular recess 21 extending there-around and adapted to register with a similar semi-circular recess 22 formed in the top of the base 14. A compression-spring 23 is mounted in said registering recesses. Said spring is interposed between a flattened surface of a pin 24 mounted in and depending from the compression member 20 into said recess and a flattened upwardly projecting portion of a pin 25 mounted in the base 14 and projecting upwardly into said recesses. Said compression spring thus urges said compression member to rotatably move in a counterclockwise direction. A stop 27 threaded in a lug 29 projecting upwardly from the base 14 is adapted to be engaged by a pin 30 projecting outwardly from the compression member 20, to limit movement of said member to open or release position. A radially spaced stop 31 threaded in a lug 32 secured to and projecting upwardly from the base plate 14, is provided to stop or limit travel of said compression member in a direction to compress the piston ring when no ring is in the gauge, to save overcompressing the spring 23. An operating lever or handle 34 is herein shown as being threaded in and projecting radially outwardly from said compression member 20 and as being locked in position thereon, as by a lock nut 35. Said operating handle affords a means for turning said compression member between the stops 27 and 31, to compress the ring, said member being returned to the stop 27 by the spring 23, after the ring has been gauged.

The annular guide member 15 has a recessed spiral guide 36 formed in the periphery thereof and open to the top thereof and to the inner periphery of the compression member 20. Said guide terminates at its lower end into an abutment or stop 37, adapted to abut one end of the piston ring. A compression pin 39 is mounted in the compression member 20 above and spaced circumferentially from the abutment 37 in a counterclockwise direction when the fixture is in the open position shown in Figure 1. Said compression pin extends inwardly from said compression member in alignment with the upper run of the spiral guide 36 and has a flat radial face 40 adapted to engage the opposite end of the piston ring from the abutment 37 to compress it upon rotational movement of said compression member.

When the fixture is in the position shown in Figure 1, the piston ring may be placed in the spiral guide 36 with one of its ends abutting the abutment surface 37 and its opposite end portion extending over and overlapping the lower run of said ring. If the overlapping end of the ring falls between gauge marks 38, 38 on the compression member 20, the ring is passable for free length. If not, the ring is discarded. Where the ring is passable for free length, the handle 34 may be grasped and the compression member 20 turned in a clockwise direction from the stop 27 against the spring 23 until the radial abutment face 40 of the pin 39 comes into engagement with the overlapping end of the ring, and is moved to a position adjacent the stop 31, as shown in Figure 2, until the piston ring is fully compressed to the condition it will assume when in a piston and cylinder of an internal combustion engine. Said compressed condition is reached before engagement of the stop 30 with the stop 31 and is determined by the point at which the handle 34 and compression member 20 can be turned no further without tending to force or spring the ring out of the spiral guide 36.

An indicating means is provided to indicate the compressed length of the ring or the gap between or overlap of adjacent ends of the ring. Said indicating means as herein shown includes a dial 41 on an inclined arcuate surface of a member 42, secured to the top of the plate 14 and extending upwardly therefrom, and herein shown as conforming to and extending along the outer periphery of the compression member 20, for a portion of the circumference thereof. Said indicating means also includes a pointer 43 on a flat upwardly projecting inclined surface 44 of the compression member 20. Said pointer is herein shown as being an arrowhead which may be stamped or painted on the top surface of said inclined surface. When said pointer registers with the space between two gauge marks 45—45 of the dial 41, the indication is that the piston ring is of the correct length and that the gap between adjacent ends of the ring is correct for efficient operation in the piston and cylinder of an internal combustion engine. When said pointer is to the left of said gauge marks 45—45, the indication is that the gap between the adjacent ends of the ring is too narrow, and when it is at the right of said lines the indication is that the gap between adjacent ends of the ring is too wide.

It may be seen from the foregoing that a novel form of gauging fixture has been provided to gauge both the free length of a flexible oil ring and the gap between or overlap of adjacent ends of the ring when compressed, and that the gauging thereof is by a simple operation effected by placing the ring in a spiral guide formed in a stationary part and opening to a movable part, with one end of the ring abutting one end of the guide and the other end of the ring overlapping the one end of the ring, and by then gauging the free length of the ring by determining the relation of the free end thereof with respect to gauge marks on the movable part. The abutment surface on the movable part may then be moved into engagement with the free end of the ring and turned further to compress it to the condition it will assume when in a cylinder and piston of an internal combustion engine. The gap between or overlap of adjacent ends of the ring is then readily determined by looking at the gauge.

It will be understood that various modifications and variations of the present invention may be effected without departing from the spirit and scope of the novel concepts thereof.

I claim as my invention:

1. In a gauging fixture for split longitudinally compressible spring rings, a stationary part, a rotatable part associated with said stationary part, a guide in one of said parts conforming to the ring when free and having an end portion adapted to abut one end of the ring, an abutment on the other of said parts overlapping said guide in position to abut the other end of the ring, means for rotatably moving said rotatable part to fully compress the ring, and indicating means associated with said movable and stationary parts indicating the gap between or overlap of adjacent ends of the ring when compressed.

2. In a gauging fixture for split flexible oil piston rings, a base having a stationary part, a rotatable part on said base associated with said stationary part, a spiral guide on one of said parts conforming to the form of the piston ring when free and having an abutment adapted to abut one end of the piston ring, an abutment on the other of said parts, overlapping said guide and extending into position to abut the other end of the piston ring, means for rotatably moving said rotatable part to move the ends of the piston ring relative to each other and compress the ring to the form it will assume in a piston and cylinder, and indicating means associated with said movable and stationary parts indicating the gap between or overlap of adjacent ends of the ring when compressed.

3. In a gauging fixture for split flexible oil piston rings, a base having a stationary part, a rotatable part on said base and associated with said stationary part, a spiral guide in one of said parts conforming to the form of the piston ring when free and having an abutment adapted to abut one end of the piston ring, an abutment on the other of said parts overlapping said guide and extending into position to abut the other end of the piston ring, a stop for said rotatable part, a spring urging said rotatable part against said stop, manually operable means for moving said rotatable part against said spring and compressing the ring to the form it will assume in a piston and cylinder, and indicating means associated with said stationary and rotatable parts indicating the gap between adjacent ends of the ring when compressed.

4. In a gauging fixture for split piston rings, two parts, one of which is annular and encircles the other part, means for rotatably moving one of said parts relatively to the other, a spiral piston ring receiving guide in the inner of said parts, open at its top and opening to said outer part, said guide having an abutment surface at one end thereof adapted to be abutted by one end of the piston ring, an abutment member on said outer part extending inwardly therefrom and adapted to abut the end of the piston ring opposite from said abutment surface, and indicating means associated with said stationary and rotatable parts, indicating the gap between or overlap of adjacent ends of the piston ring when compressed by relative rotatable movement of one of said parts with respect to the other in a direction to move the ends of the piston ring away from each other.

5. In a gauging fixture for split piston rings, a base, a guide member associated with said base and having a spiral guide formed therein having an end portion adapted to abut one end of the piston ring, an annular compression member encircling said guide member and mounted for rotatable movement thereabout, an abutment member associated with said compression member and extending over said guide, and adapted to abut the opposite end of the piston ring from said end portion of said guide and compress the ring upon rotatable movement of said compression member with respect to said guide member, and indicating means associated with said guide and compression members indicating the gap between or overlap of adjacent ends of the ring when compressed.

6. In a gauging fixture for split flexible oil piston rings, a base, a guide member associated with said base and having a spiral guide formed therein having an end portion adapted to abut one end of the piston ring, an annular compression member encircling said guide member and mounted for rotatable movement thereabout, an abutment member associated with said compression member and extending over said guide and adapted to abut the opposite end of the piston ring from said end portion of said guide, manually operable means for rotatably moving said compression member with respect to said guide member to compress the ring, and indicating means on said base and compression member and cooperating to indicate the gap between or overlap of adjacent ends of the ring when compressed.

7. In a gauging fixture for split flexible oil piston rings, a base, a guide member associated with said base and having a spiral guide formed therein having an end portion adapted to abut one end of the piston ring, an annular compression member encircling said guide member and mounted for rotatable movement thereabout, an abutment member associated with said compression member and extending over said guide and adapted to abut the opposite end of the piston ring from said end portion of said guide, a stop on said base adapted to be engaged by said compression member, a spring for urging said compression member into engagement with said stop, indicating means on said base and compression member movable relation to each other and cooperating to indicate the distance between adjacent ends of the ring, and manually operable means adapted to rotatably move said compression member and compress the ring in said guide against said stops.

8. A gauging fixture for split flexible oil piston rings comprising a piston ring receiving guide member, an annular compression member encircling said guide member and mounted for rotatable movement thereabout, said piston ring receiving guide member having a piston ring receiving spiral guide formed therein open at its top and opening to the inner periphery of said compression member and having an abutment surface at one end thereof adapted to abut one end of the piston ring, an abutment member extending inwardly from said compression member over said guide and adapted to abut the opposite end of the piston ring from said abutment surface, means for rotatably moving one of said members relative to the other in a direction to compress the ring, and indicating means associated with said guide and compression members and indicating the gap between or overlap of adjacent ends of the ring when compressed.

9. A gauging fixture for split compressible spring piston rings and the like including a stationary part, a rotatable part mounted on said stationary part for movement with respect thereto, a spiral guide of cylinder bore form in one of said parts having an abutment at one end thereof adapted to abut one end of a ring placed on said guide, gauge marks on one of said parts so arranged as to indicate the free length of the ring when placed on said guide with one end thereof against said abutment, an abutment on the other of said parts movable into engagement with the other end of the ring, means for moving said rotatable part relative to said stationary part, to compress the ring, and indicating means associated with said stationary and movable parts and cooperating to inidicate the length of the compressed ring.

SAMUEL H. NORTON.

REFERENCES CITED

The following references are of record in the file of this patent:

UNITED STATES PATENTS

| Number | Name | Date |
|---|---|---|
| 144,606 | Fenton | Nov. 18, 1873 |
| 146,974 | Allen | Feb. 3, 1874 |
| 255,764 | Brubaker | Apr. 4, 1882 |
| 861,582 | Fildes | July 30, 1907 |
| 1,282,772 | Denhofer | Apr. 29, 1918 |
| 1,314,085 | Mastrangelo | Aug. 26, 1919 |
| 1,381,075 | Louden | June 7, 1921 |
| 1,611,441 | Higgins | Dec. 21, 1926 |
| 1,625,453 | Capuano | Apr. 19, 1927 |
| 1,703,873 | Farmer | Mar. 5, 1929 |
| 1,860,174 | Cronk | May 24, 1932 |
| 1,904,048 | Hill | Apr. 18, 1933 |
| 2,487,628 | Aller | Nov. 8, 1949 |